(12) United States Patent
Gossweiler, III et al.

(10) Patent No.: US 8,306,267 B1
(45) Date of Patent: Nov. 6, 2012

(54) OBJECT TRACKING

(75) Inventors: Richard C. Gossweiler, III, Sunnyvale, CA (US); Yong Zhao, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/302,192

(22) Filed: Nov. 22, 2011

Related U.S. Application Data

(60) Provisional application No. 61/484,148, filed on May 9, 2011, provisional application No. 61/484,554, filed on May 10, 2011.

(51) Int. Cl.
*G06K 9/00* (2006.01)
(52) U.S. Cl. .................................................... 382/103
(58) Field of Classification Search .................. 348/169, 348/208.14, E13.049, E13.05, E13.051, E13.052; 382/103, 107, 118, 181, 190, 203, 205, 209, 382/216, 217, 218, 219, 221; 396/51; 701/519; 706/20
See application file for complete search history.

(56) References Cited

U.S. PATENT DOCUMENTS

| | | | | |
|---|---|---|---|---|
| 6,301,370 | B1 * | 10/2001 | Steffens et al. | 382/103 |
| 2005/0063569 | A1 * | 3/2005 | Colbert et al. | 382/118 |
| 2006/0083423 | A1 * | 4/2006 | Brown et al. | 382/159 |
| 2007/0098396 | A1 * | 5/2007 | Watanabe et al. | 396/374 |
| 2008/0013832 | A1 * | 1/2008 | Lev | 382/181 |
| 2010/0111363 | A1 * | 5/2010 | Kelly et al. | 382/103 |
| 2010/0296699 | A1 * | 11/2010 | Pupilli et al. | 382/103 |
| 2011/0090303 | A1 | 4/2011 | Wu et al. | |
| 2011/0311100 | A1 * | 12/2011 | Fan | 382/103 |

OTHER PUBLICATIONS

'Gadget Lab' [online]. "Apple's Next iOS Improves Interface, Adds New Gestures," Jan. 13, 2011, [retrieved on Oct. 14, 2011]. Retrieved from the internet: <URL: http://www.wired.com/gadgetlab/2011/01/apple-ios-multitouch/?pid=1238&viewall=true>. 11 pages.
'HotTips!' [online]. "Software Gives Ipad 2 Glasses-Free 3D Viewing!," Apr. 18, 2011, [retrieved on Oct. 14, 2011]. Retrieved from the internet: <URL: http://hottipscentral.com/software-gives-ipad-2-glasses-free-3d-viewing/>. 8 pages.
'~jfk ' [online]. 2008-2011, [retrieved on Oct. 14, 2011]. Retrieved from the internet: <URL: http://johanneskuhlmann.de/projects/facedetect>. 4 pages.
'MSDN Magazine' [online] "MultiTouch Capabilities in Windows 7," Aug. 2009, [retrieved on Oct. 14, 2011]. Retrieved from the internet: <URL: http://msdn.microsoft.com/en-us/magazine/ee336016.aspx>. 7 pages.

(Continued)

*Primary Examiner* — Gregory F Cunningham
(74) *Attorney, Agent, or Firm* — Fish & Richardson P.C.

(57) ABSTRACT

In general, the subject matter described in this specification can be embodied in methods, systems, and program products. A computing system accesses an indication of a first template that includes a region of a first image. The region of the first image includes a graphical representation of a face. The computing system receives a second image. The computing system identifies indications of multiple candidate templates. Each respective candidate template from the multiple candidate templates includes a respective candidate region of the second image. The computing system compares at least the first template to each of the multiple candidate templates, to identify a matching template from among the multiple candidate templates that includes a candidate region that matches the region of the first image that includes the graphical representation of the face.

20 Claims, 9 Drawing Sheets

OTHER PUBLICATIONS

'YouTube' [online]. "3D The Nokia N900 Through Head Tracking," Apr. 28, 2010, [retrieved on Oct. 10, 2011]. Retrieved from the internet: <URL: http://www.youtube.com/watch?v=yWPNNBepBUw&feature=relat d>. 2 pages.

'YouTube' [online] "Head Tracking for iPad: Glasses-Free 3D Display," Apr. 6, 2011, [retrieved on Oct. 14, 2011]. Retrieved from the internet: <URL: http://www.youtube.com/watch?v=bBQQEcfkHoE>.3 pages.

Gast, E.R. "A Framework for Real-Time Face and Facial Feature Tracking using Optical Flow Pre-estimation and Template Tracking," Master Thesis, LIACS Leiden University, Apr. 2010, 66 pages.

Gossweiler, et al., "An Introductory Tutorial for Developing Multi-User Virtual Environments," Computer Science Department-University of Virginia, 1994, 18 pages.

PalmPilot Handbook, 3Com Corporation, 1997, 202 pages.

Wang et al. "Face Tracking Using Motion-Guided Dynamic Template Matching," 5$^{th}$ Asian Conference on Computer Vision—National Laboratory of Pattern Recognition, Melbourne, Australia, Jan. 25, 2002, 6 pages.

\* cited by examiner

OBJECT TRACKING

CROSS-REFERENCE TO RELATED APPLICATIONS

This application claims priority to U.S. Provisional Application Ser. No. 61/484,148, filed on May 9, 2011, entitled "Object Tracking," and U.S. Provisional Application Ser. No. 61/484,554, filed on May 10, 2011, entitled "Object Tracking," the entire contents of which are hereby incorporated by reference.

BACKGROUND

Computer systems can perform object detection, which is the process of finding an object in an image (e.g., a frame of a video sequence). In some examples, object tracking processes are used to track the movement of a human face in a sequence of frames of video that a computer system camera is recording. The computer system can modify a visual display based on the movement of the face.

SUMMARY

This document describes techniques, methods, systems, and other mechanisms for performing computerized object tracking. In general, a computer system can track movement of a user's face in video obtained by a camera. The computer system can identify a region of a video frame that illustrates a user's face, and can compare the identified region to numerous candidate regions that may illustrate the user's face in a subsequent video frame. In some implementations, the computer system may modify some of the candidate regions, for example, by rotating and scaling the candidate regions. The computer system can then identify a candidate region that matches the identified region. The computer system can then determine how (i.e., in what direction(s)) the user's face has moved between video frames based on the change in location of the region illustrating the user's face and the rotation and scaling that was applied to the matching candidate region.

As an alternative to the attached claims and the embodiments described in the below description, the present invention could also be described by one of the following implementations.

Implementation 1 is a computer-implemented method. The method includes accessing, by a computing system, an indication of a first template that includes a region of a first image, the region of the first image including a graphical representation of a face. The method includes receiving, by the computing system, a second image. The method includes identifying, by the computing system, indications of multiple candidate templates, each respective candidate template from the multiple candidate templates including a respective candidate region of the second image. The method includes comparing, by the computing system, at least the first template to each of the multiple candidate templates, to identify a matching template from among the multiple candidate templates that includes a candidate region that matches the region of the first image that includes the graphical representation of the face.

Implementation 2 is the method of implementation 1, wherein comparing at least the first template to each of the multiple candidate templates includes performing a pixel-wise sum of the absolute differences between one of the at least first template and one of the multiple candidate templates.

Implementation 3 is the method of any one of implementations 1-2. The method further includes designating, by the computing system and as a region of the second image that includes a graphical representation of the face in the second image, the region of the second image that is included in the matching template.

Implementation 4 is the method of any one of implementations 1-3. The method further includes receiving the first image at the computing system as a first frame of a video that is captured by a camera. The second image is a second frame of the video that is captured by the camera, and the second frame is an immediately next frame in the video after the first frame.

Implementation 5 is the method of any one of implementations 1-4. The method further includes requesting, by the computing system, an object detection process on the first image to identify the region of the first image as including the graphical representation of the face, the object detection process analyzing one or more portions of the first image that are not included in the region of the first image; wherein comparing at least the first template to each of the multiple candidate templates does not include analyzing one or more portions of the second image that are outside of the respective multiple candidate templates.

Implementation 6 is the method of any one of implementations 1-5. The method further includes requesting, by the computing system, an object detection process on the first image to identify the region of the first image as including the graphical representation of the face. The object detection process performs one or more feature detection processes on the first image. Comparing the first template to each individual candidate template of the multiple candidate templates does not include performing the one or more feature detection processes on each individual candidate template.

Implementation 7 is the method of any one of implementations 1-6. The method includes requesting, by the computing system, an object detection process on the first image to identify the region of the first image as including the graphical representation of the face, wherein the object detection process is performed by a central processing unit of the computing system or another computing system and comparing at least the first template to each of the multiple candidate templates is performed by a graphics processing unit of the computing system.

Implementation 8 is the method of any one of implementations 1-7. The method further includes generating, by the computing system, multiple additional first templates that include respective regions of different images, the regions of the different images including respective graphical representations the face; and wherein comparing at least the first template to each of the multiple candidate templates includes comparing the multiple additional first templates to each of the multiple candidate templates to identify the matching template from among the multiple candidate templates matches a region included in one of the first templates.

Implementation 9 is the method of any one of implementations 1-8, wherein the region of the first image includes mouth, nose, and eyes of the face.

Implementation 10 is the method of any one of implementations 1-9, wherein: the region of the first image is a non-rectangular region; the first template is a normalized representation of the region of the first image; and generating the normalized representation of the region of the first image includes generating a rectangular representation of the region of the first image.

Implementation 11 is the method of any one of implementations 1-10, wherein the first template has same dimensions as each of the multiple candidate templates.

Implementation 12 is the method of any one of implementations 1-11, wherein: the first template is a normalized representation of the region of the first image; and normalizing the region of the first image to generate the first template includes changing a viewpoint of the region of the first image.

Implementation 13 is the method of any one of implementations 1-12, wherein: the multiple candidate templates are normalized representations of their respective regions of the second image; and normalizing the respective regions of the second image to generate the multiple candidate templates includes changing a viewpoint of at least one of the respective regions of the second image.

Implementation 14 is the method of implementation 13, wherein: the face in at least one of the respective regions of the second image is not directed forward; and changing the viewpoint of the at least one respective region includes changing the viewpoint so that the face in the respective candidate template is directed forward.

Implementation 15 is the method of any one of implementations 1-14. The method further includes, before identifying the matching template that includes the candidate region that matches the region of the first image, verifying that the matching template represents a face by providing the matching template or a graphical representation included in the matching template to a face verification system.

Implementation 16 is the method of any one of implementations 1-15. The method includes using a location of the candidate region, of the matching template, in the second image to truck at least a portion of a view on a graphical display of the computing system so as to at least partially track movement of the face with the at least portion of the view on the graphical display.

Implementation 17 is the method of any one of implementations 1-16, wherein identifying the indications of the multiple candidate templates includes selecting, as the regions of the second image to include in the respective multiple candidate templates, regions of the second image based on a determined trajectory of the face in the first image and images that were received before the first image.

Implementation 18 is a computer-implemented method. The method includes receiving, by a computing system, a first frame of a video; requesting, by the computing system, performance of an object detection process on the first frame of the video in order to identify an object; receiving, by the computing system and in response to requesting performance of the object detection process, an indication of a first region of the first frame that includes a graphical representation of the object; receiving, by the computing system, a second frame of the video; requesting, by the computing system, identification of multiple candidate regions in the second frame; requesting, by the computing system, indications of multiple candidate templates that represent versions of the multiple candidate regions, at least some of the multiple candidate templates each including a graphical representation of a viewpoint of the represented candidate region that is different than a graphical representation of a viewpoint of the respective candidate region as included in the second frame; requesting, by the computing system, comparison of the multiple candidate templates to the first region or a first template that is generated from the first region to identify a matching template; and designating, by the computing system, the region of the second frame from which the matching template was generated as a region of the second frame that includes a graphical representation of the object.

Other implementations include one or more computer-readable storage devices storing instructions that, when executed by one or more processing devices, perform operations according to the above-described methods. Other implementations include systems and apparatus that include the described one or more computer-readable storage devices and that are configured to execute the operations using one or more processing devices.

Implementation 19 is a computerized system. The system includes a camera adapted to receive multiple frames of video; computer-readable memory to store an indication of a first region, in a first frame of the video, that includes a graphical representation of a face; a computerized face candidate generator to identify, in a second frame of the video that is subsequent to the first frame of the video, multiple candidate regions; and a computerized match determiner to compare the multiple candidate regions to the first region in order to identify one of the multiple candidate regions as including a graphical representation of the face in the second frame of the video.

Implementation 20 is the system of implementation 19, wherein: the computerized face candidate generator creates multiple candidate templates from at least some of the multiple candidate regions, each candidate template being a representation of the respective candidate region that has been normalized to a standard image size, at least some of the multiple candidate templates illustrating the respective candidate regions from viewpoints that are different than viewpoints of the respective candidate regions; and the computerized match determiner's comparing the multiple candidate regions to the first region includes comparing the multiple candidate templates to the first region or a template that is generated from the first region.

Particular implementations can be implemented, in certain instances, to realize one or more of the following advantages. A location of a face in an image can be tracked through multiple frames of a video in a computationally efficient manner. As such, a computer system need not perform a face detection process for every frame of video in which the face is tracked. Rather, the computer system may find a portion of a new image that matches a portion of previous image that has been designated as a user's face. The system may track the user's entire face, and as such may be able to track the user's face even when the user is wearing accessories that obscure part of the face (e.g., glasses). Further, a graphics processing unit may be used to generate multiple views of regions of an image that may represent the user's face, reducing computational burden on the central processing unit.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
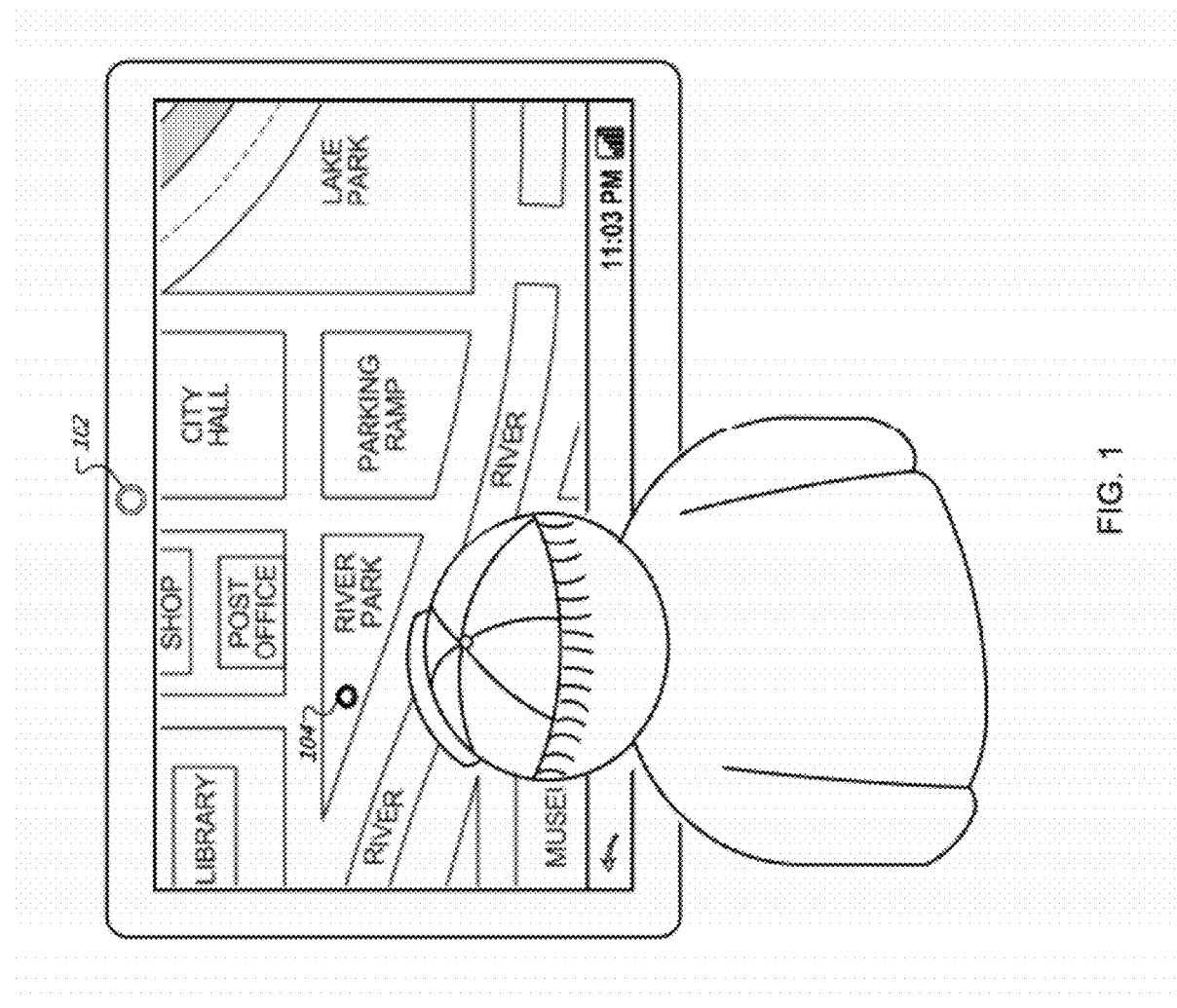
FIGS. 1 and 2 illustrate a computing device that trucks a display of a map in a direction as a user moves his/her face in the direction.

This document generally describes object detection and tracking. A computer system can include and/or receive video data from a camera that is capable of periodically recording an image to generate a video sequence. In some implementations, the computer system may analyze the images in the video sequence to identify and track a human face that may be present in the video. The computer system may apply any identified motion of the human face as a user input to the computer system. For example, a user of a tablet computing device that includes a front-facing camera may move his/her head (or the tablet) to truck a display of a street map.

The above-described face tracking can be performed by comparing regions of images. For example, a user of a tablet computing device can launch a maps application and enter input that selects a "Track My Movements" feature (e.g., a graphical user interface element). In the example, the tablet can capture an image using a camera in communication with the tablet (e.g., a front-facing camera included in the tablet) and send the captured image to a face-detection engine (via, e.g., a network). The face-detection engine can then identify whether the captured image includes a face (e.g., a human face). If the captured image does include a face, the face-detection engine can send, to the tablet, indications of regions in the captured image that correspond to the face, a scale of the face, and an orientation of the face.

In some implementations, the tablet computer can continue to capture additional images and, for each captured image, perform a process to identify the user's face in that captured image. This process to identify the user's face can include comparing multiple regions of a given captured image to a region in a previously-captured image that has been determined to include a representation of the user's face.

In greater detail, the computing system takes the region in the previously-captured image that has been determined to illustrate the user's face and designates this region as representing the user's face. The computing system can generate a template image that may be a normalized representation of the region. The normalizing process can include normalizing the average intensity of the region to a standard value or range of values and normalizing the size of the region to a standard size (e.g., scaling the size of the region to 32×32 pixels or 64×64 pixels). Such a template image may be stored as a representation of the user's face for comparison to subsequently captured images to identify the user's face in the subsequently captured images. A template image that is stored for later comparison is referred to herein as a current template.

The computing system may store multiple current templates at a same time. For example, as the computing system follows the user's face through several frames and generates templates of regions that are identified as matching the user's face (as discussed in greater detail below), some of these matching templates may be determined to have significantly different characteristics than one or more presently stored current templates. For example, a template that is identified as representing the user's face may show the user's face from a different viewpoint. A matching template with such significantly different characteristics can be stored as an additional current template to provide the computing system with a robust collection of current templates that represent the user's face.

The computer system may receive a subsequent image, for example, in response to the camera recording (e.g., capturing) the subsequent image. The user's face may have moved slightly in this image (e.g., because the user moved his/her face to the side, rotated his/her face, or pulled his/her face away from the camera). The computer system, however, may not have an indication of exactly where the user has moved his/her face. The tablet can estimate where the user has moved his/her face based on information that identifies a trajectory of the user's face over multiple previous frames. The tablet may be able to determine an expected location, scale, and rotation of the user's face from this information. Using these expected characteristics of the user's face, the tablet may generate candidate templates from regions of the subsequent image that are around and include the expected location of the user's face. Candidate templates may be images that are generated from regions of the subsequent image that are estimated to correspond to the user's face. These candidate templates may be normalized representations of the respective regions of the subsequent image.

Further, for each of the regions around and including the expected location of the user's face, the tablet may generate multiple further candidate templates. The multiple further candidate templates can be generated by modifying the regions to have slightly different viewing angles (e.g., viewing angles that may be expected based on a historical rotation of the user's face). Further, the tablet may generate multiple additional candidate templates by modifying the regions to vary in scale. Some candidate templates may be modified in both viewing angle and scale. In summary, the computer system may generate numerous candidate templates. These candidate templates include regions of the subsequently captured image and variations of the regions of the subsequently captured image. In some examples, a template can be an indication of a region of an image. For example, in those instances in which a candidate template represents a region of an image without modification to that portion of the image, the candidate template may include information identifying the bounding vertices of the region of the image. A template does not have to be a separate image.

The tablet may compare each candidate template to each of the current templates to identify the candidate template that most-closely resembles any one of the current templates. As such, the computer system may essentially operate to map unidentified regions of a most-recent video frame and variations of these unidentified regions to a portion of an earlier video frame that the computing system has identified as a face (e.g., a human face). This procedure may be in contrast to a system that modifies the location and orientation of a determined representation of a face in an image to generate one or more modified representations of the face, and attempts to find a portion of a subsequent image that matches any of the one or more modified representations of the face in the previous image. Such a system may exaggerate tracking errors over a series of frames.

Upon identifying a matching template, the computing system can verify that the matching template represents a human face by sending the subsequent image or the matching template to a face verification system. For example, the computing system may send the subsequent image and indications of the identified position, size, and orientation of the face to the face verification system. The face verification system can use this information to reduce the computational burden in identifying and verifying a face in the image. In some examples, the face verification system is the same system as the face detection engine. The face verification system can indicate to the computing system whether the identified region of the image may be a face, and can refine the position, size, and orientation data. The face verification system may not analyze the entire image, but may analyze a region of the image that has been identified as a face. If the identified region of the face (or the matching template) is not determined to represent an illustration of a face, the computer system may restart the process by sending an image to the face detection engine.

If the face verification system indicates that the matching template represents a face, the tablet can designate the matching template as a current template. In some examples, the tablet stores a most recent matching template as a current template for at least one frame. In some examples, the computing system stores a most recent matching template as a current template if the matching template exhibits significantly different characteristics than the existing one or more current templates.

The tablet also updates information that identifies characteristics of the face in the recently-captured image. For example, the tablet may store information that identifies the location of the face in the recently-captured image. The tablet may also store information that identifies a scale of the face in the recently-captured image and an orientation of the face in the recently-captured image. The scale and orientation of the face can be determined based on the scale and orientation of the face illustrated in the previously-captured image and the change in scale and orientation that the computer system applied to the portion of the new image from which the matching template was generated to generate the matching template. In some examples, this determined scale and orientation may be the information that is provided to the face verification system. The face verification system may further refine the data that identifies the scale and orientation of the image.

The tablet may store information that identifies a boundary of the region of the current templates in images. Although each current template may be a rectangular shape (e.g., 64×64 pixels), the region from which the current template was normalized may be designated by four vertices that represent a non-rectangular shape, for example, an irregular trapezoid. The computer system may identify a face region with a trapezoid when the face is oriented to the side of the camera rather than being oriented directly-forward towards the camera in an orientation in which the user stares into the camera head on. The computer system may store such information for multiple frames of video.

The tablet may also store information that identifies movement of the user's face between images. For example, the system may determine side-to-side movement of the face based on a change in the x-y coordinates of the vertices of the regions that correspond to the matching templates over multiple frames. The system may determine rotation of the face based on the change in identified orientation of the face over multiple frames. The system may determine the movement of the face towards or away from the camera based on the change in identified scale of the face over multiple frames.

Figure 2:
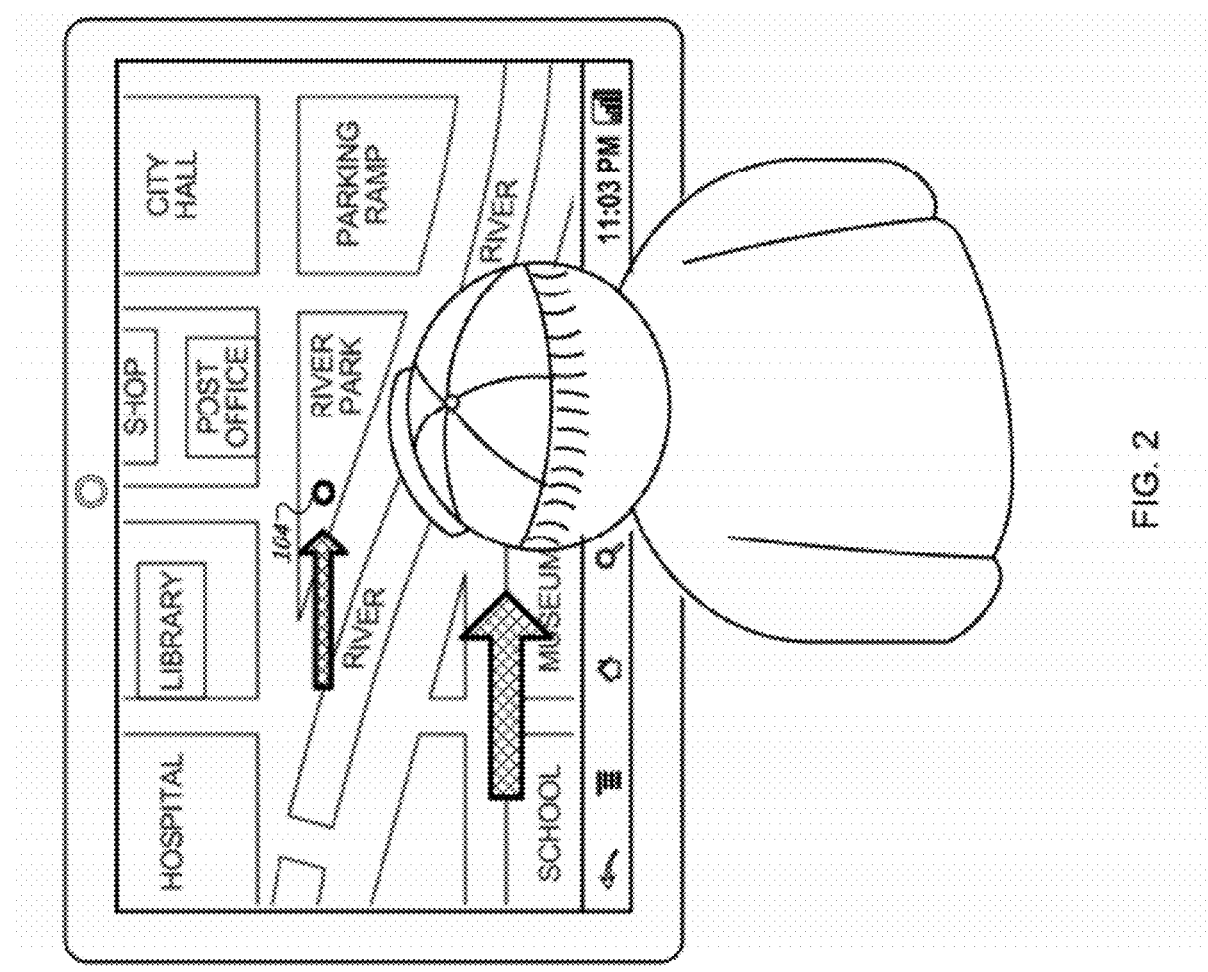

The tablet may use the information generated through the face tracking process as user input to manipulate a graphical display. For example, if the user moves his/her head to his/her right as illustrated in FIGS. 1 and 2 (or if the user moves the tablet to his/her left), a map may truck to the right with the user's head. A display that "trucks" to a side may be a display that shows content moving to the side. Content may be removed from the display at the edge that is in the direction of movement, and may newly appear in the display at the edge that is opposite the direction of movement. The term "truck" references the camera motion by the same name in film production. In that context, trucking means to move the camera physically to the side while maintaining its perpendicular relationship to the object being filmed.

In the example of FIGS. 1 and 2, the camera 102 records images and the indicator 104 identifies the interpretation by the computer system of the user's face location. As the user moves his/her face, the indicator 104 moves across the display. The map may similarly move as if the user had touched a display of the map on a touchscreen device and dragged the map to the right. If the user moves his/her head away from the tablet (or if the user moves the tablet away from his/her head), the map may zoom out. If the user rotates his/her head to the side (or tilts one end of the tablet away from the user), the tablet may change the map display so that the user can see three-dimensional aspects of the map (e.g., the sides of buildings or mountains).

Although the preceding example explains steps that occur by a tablet device, such steps may occur by a remote server system at the request of the tablet device. Further, the steps that are described as occurring at a remote server system may be performed by the tablet.

Figure 3:
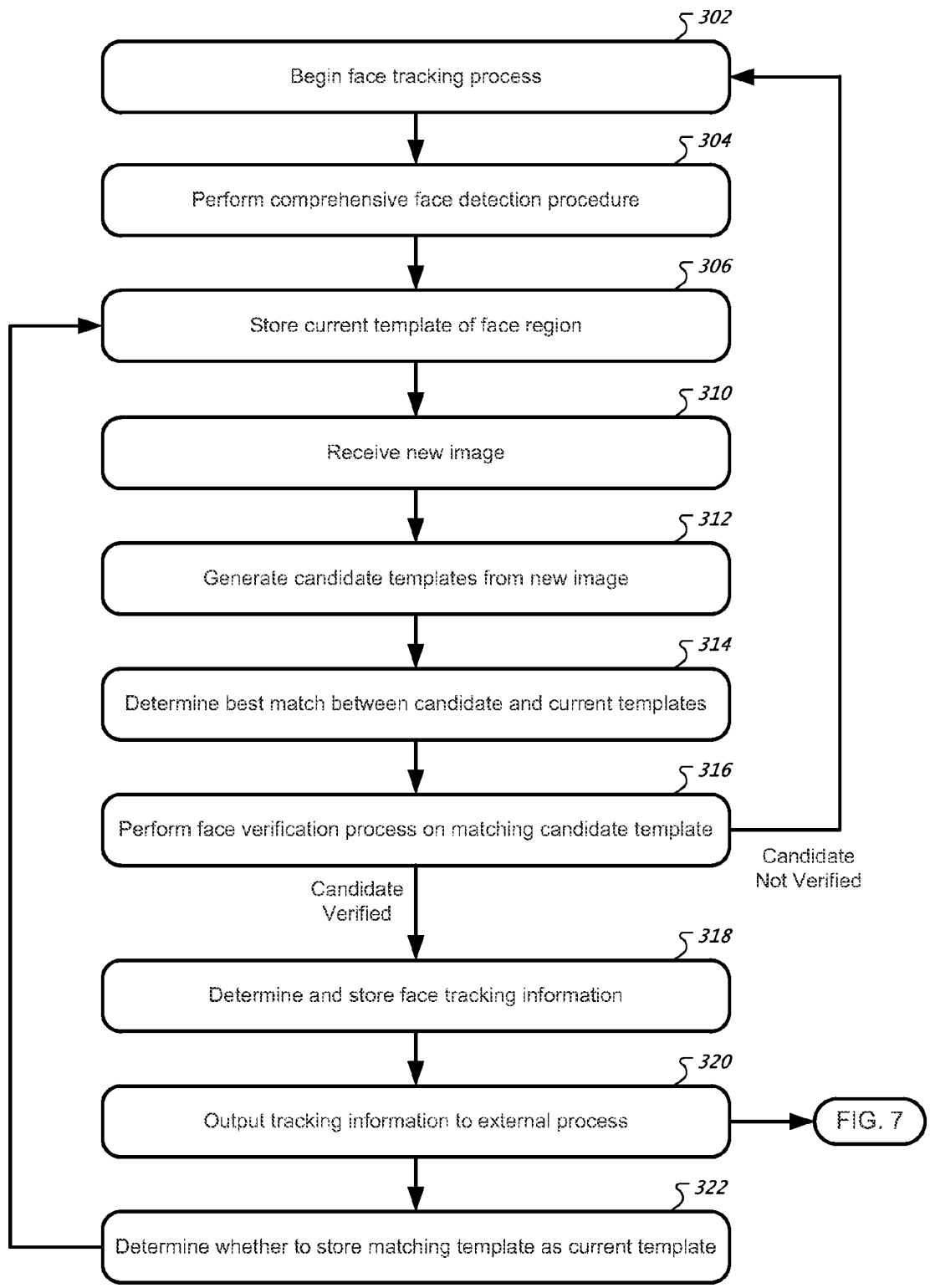
FIG. 3 shows a flowchart of an example process for performing face identification in an image.

FIG. 3 shows a flowchart of an example process for performing face identification in an image.

In box 302, a computing system begins a face tracking process. In some examples, the face tracking process begins upon the computing system determining that a user provided input requesting that the face tracking process begin (e.g., the user may select a graphical user interface element that turns on face tracking). In other examples, the face tracking process begins upon the computing system losing track of a user's face in a previous iteration of the face tracking process (as described below).

In box 304, the computing system performs a comprehensive face detection procedure. For example, the computing system may obtain an image using a camera that is communicatively connected to the computing system. The computing system may then analyze the image using a face detection engine. The face detection engine may analyze the entire or substantially the entire image (e.g., more than 80% of the image) to determine if the image includes a human face. As such, the face detection engine may analyze an area that is larger than a size of a region that corresponds to a template (as described in greater detail below). The face detection engine may employ any combination of one or more of the following techniques: (i) face feature analysis, (ii) skin texture analysis, (iii) iris analysis, (iv) color analysis, and (v) comparison to one or more models of human faces. In some examples, the face analysis is performed using NEVEN face analysis techniques. The face detection procedure may receive an image as an input, but may not receive any indication of a user's face within the image as an input (e.g., the face detection process may not receive x-y coordinates of the user's face or an image of substantially only the user's face).

The face detection engine may output a location of the user's face (e.g., x-y bounding coordinates of a region that illustrates the face), a size of the face, an orientation of the face, a center of the face, and locations of face features (e.g., eyes, mouth, nose, and philtrum). In various examples, a comprehensive face detection procedure uses greater computational resources than the matching procedure that is described below. The face detection engine may be located at a local computing device that is attached to the camera or may be located remotely from the computing device at a server system. In some examples, the computing system includes both the local computing device and the remote server system.

In box 306, the computing system stores a current template of the face region. As described below, the current template may be a normalized version of the region that the computer system has identified as illustrating the user's face. The current template may also be an indication of a region in an image that has been determined to include a face, but may not be a separate image. The computing system may store, in association with the current template, information that describes the face and the face region. For example, the computing system may store vertices of the region within the image. The computing system may further store a present orientation of the user's face and locations of features of the user's face.

Figure 4:
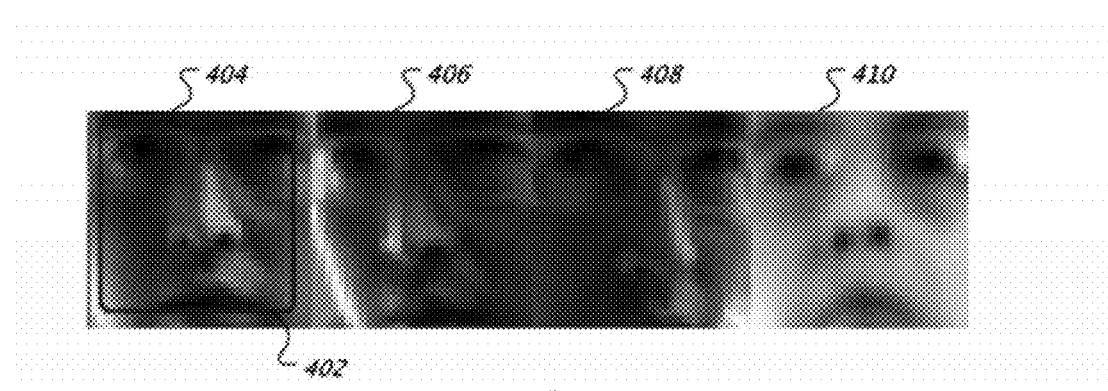
FIG. 4 shows templates that illustrate determined representations of a user's face.

As described in greater detail below, the computing system may store multiple current templates that represent the user's face in multiple different frames of video. These current templates 404, 406, 408, and 410 are shown in FIG. 4. Each of the current templates may be associated with information that identifies characteristics of the user's face. For example, the information may identify vertices of a respective region of the image from which the current template was generated, an orientation of the user's face in the image, a scale of the user's face, and a center of the user's face.

In box 310, the computing system receives a new image. For example, the computing system may capture a frame of a video that is immediately subsequent to (i) a frame on which the face detection procedure of box 304 was performed, or (ii) a frame on which the image identification procedure of boxes 312, 314, and 316 was performed (as discussed in detail below). As an example, FIG. 5A shows an image 500 that was generated using a camera of a computing system.

In box 312, the computing system generates candidate templates from the new image. The candidate templates may be normalized representations of candidate regions of the new image. The computing system may identify the regions of the new image based on the location of the region that illustrates the user's face in the previously-analyzed image. The computer system may use a determined previous velocity and acceleration of the user's face through multiple frames of the video to identify the candidate regions in the new image. As such, the candidate regions of the new image may include regions around and including an anticipated location of the user's face. The computer system may normalize the content in each of the candidate regions to generate candidate templates.

The normalization process may be the same as that described above. As such, a candidate template may be lower in resolution than the contents of the corresponding candidate region in the image. Further, the computing system may modify an intensity of the corresponding region so that the average intensity of the template may be a standard value or within a range of standard values (e.g., a range of acceptable contrast).

Figure 5A:
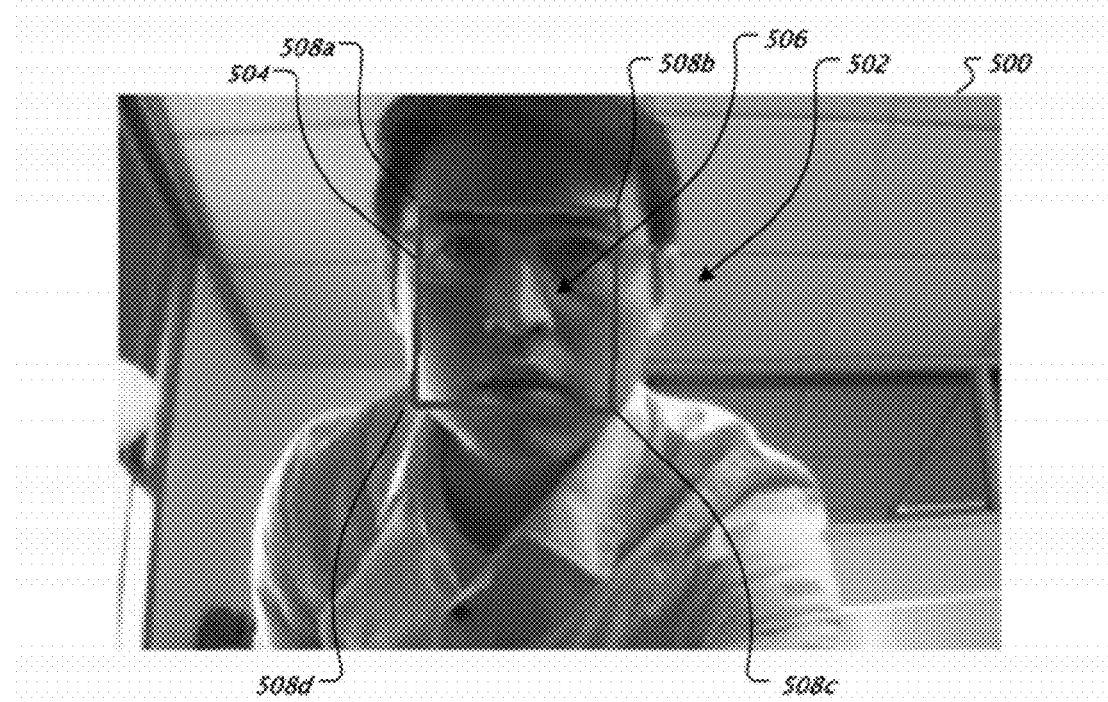
FIG. 5A shows an image that was generated using a camera of a computing system.
Figure 5B:
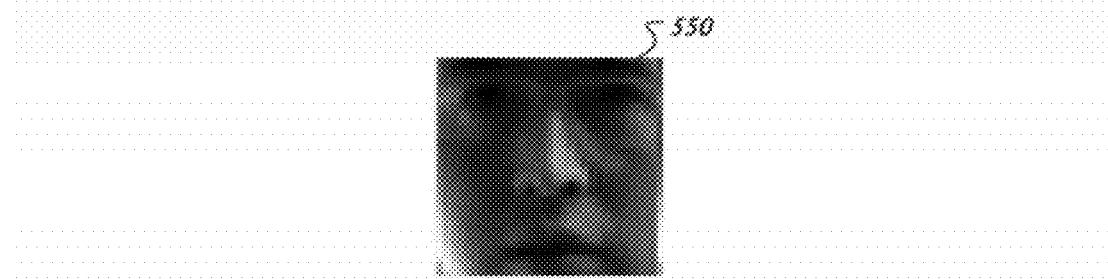
FIG. 5B shows a template that has been determined to match a previous representation of a user's face.

As an example, the image 500 of FIG. 5A includes a user's face 502 and a box 504 that has been imposed on the image by the computing system and that bounds a candidate region 506 of the image 500 that the computer system has identified as possibly illustrating the user's face. The box 504 bounds the region 506 with four vertices 508*a-d*. The box 504 may be generated from the vertices 508*a-d*. FIG. 5B shows the candidate template that was generated as a normalized version of the candidate region 506.

In addition to generating candidate templates based on the content of their respective regions, the computer system may rotate and scale the candidate templates or their respective regions to generate additional candidate templates. As such, a single region in the new image may correspond to multiple candidate templates. For example, the computer system may generate, for a single region of the new image (e.g., a single region of the same vertices), multiple candidate templates that represent different viewpoints of the single region.

Figure 6:
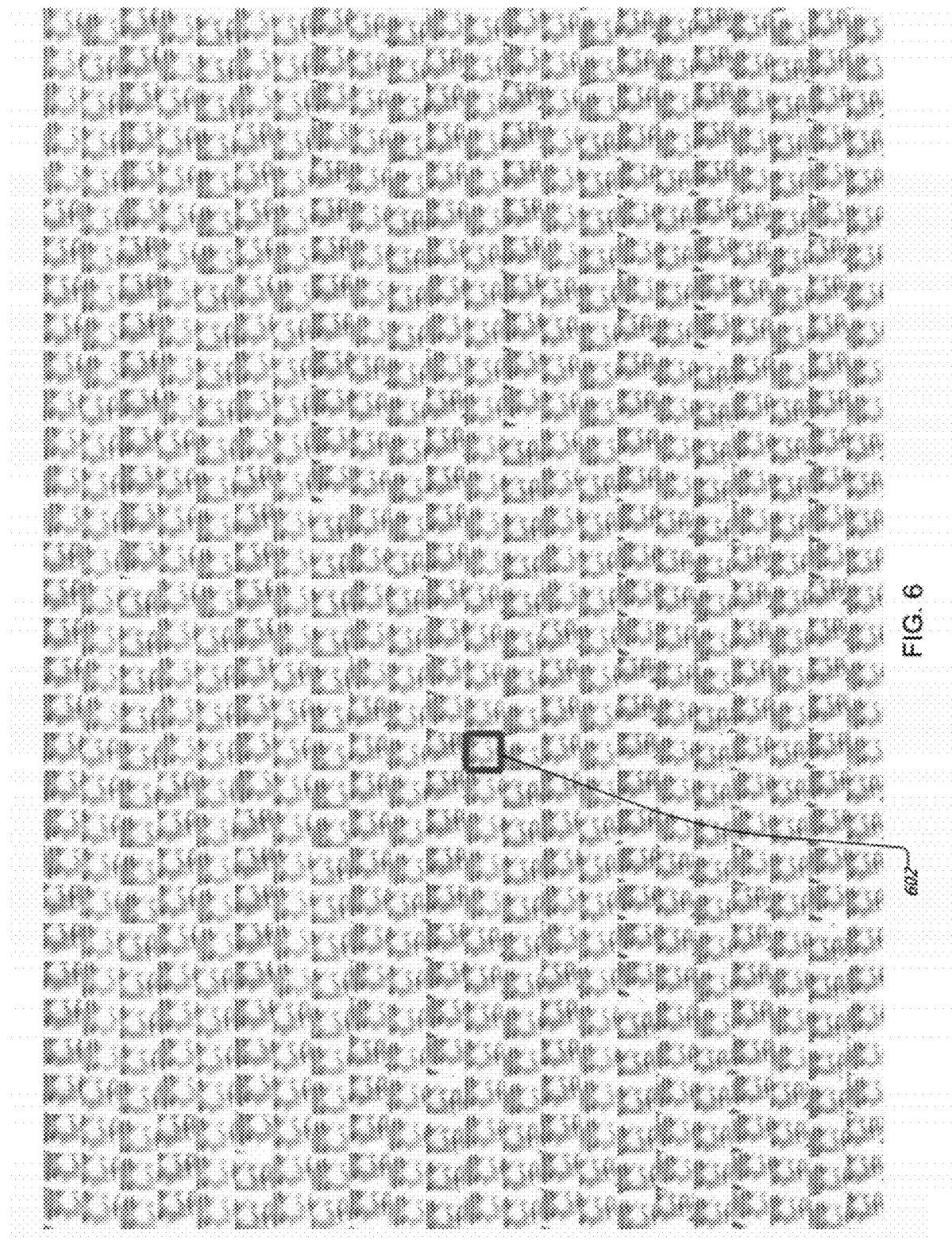
FIG. 6 shows multiple candidate templates that were generated from another image.

For each of the multiple respective viewpoints, the computer system may generate multiple candidate templates that represent different scales of the single region (e.g., where the scale of the region may be correlated to a size of the region with respect to the overall image). Some candidate templates may include modified orientation and scale. In some examples, changing the scale can include using the same image content for a candidate template and changing a numerical indication of the scale of the region that can be represented by the image content. The combination of these processes may generate numerous candidate templates (as illustrated in FIG. 6).

The computer system may generate candidate templates from different viewpoints using a graphics processing unit (GPU). As an example, a data processing pipeline of a GPU may receive as input at least (i) the three-dimensional vertices of a shape, (ii) a texture for the shape, and (iii) a requested viewpoint of the shape in three dimensional space (e.g., a location at which to place a "camera" to view the shape). The GPU may generate a view of the three-dimensional shape from the requested viewpoint with the texture layered onto the shape. This data processing pipeline can similarly be used to generate the candidate templates of the user's face from the different viewpoints. The computing system may provide the vertices of the candidate face region as the three-dimensional shape, and can provide at least the region of the image that is bounded by the vertices as the texture. The computing system further provides a desired viewpoint of the region and the GPU generates an output that shows the user's face from the desired viewpoint. The desired viewpoint may be a viewpoint that shows the user's face rotated in three-dimensions. For example, the desired viewpoint may show a view of the user's face if the user faced a camera and the camera rotated 20 degrees around the user's head. FIG. 6 shows multiple candidate templates. Box 602 shows the candidate template 550 that was generated from the region 506 of FIG. 5A.

As such, the computer system may not use face detection processes to generate the candidate templates. Rather, the computer system may generate numerous "hypotheses" as to regions of the image that could represent the user's face. These hypotheses are sometimes modified in an attempt to match the candidate region to the determined face region in a previously analyzed image. For example, the user may rotate his/her head in a clockwise direction between a previously captured frame and the newly captured frame. As described below, the matching template may be the candidate template for which the computer system rotated the user's face in a counter-clockwise direction.

In box 314, the computer system determines a best match between a candidate template and any one of the current templates. For example, the computer system may perform a computer image comparison algorithm to identify the two templates that are the most similar to each other. The comparison algorithm may not perform a face detection process. Indeed, the comparison algorithm may not perform feature analysis. Rather, the comparison may be a pixel-wise sum-of-the-absolute difference (SAD) between two templates. The SAD between two templates may provide computationally efficient comparison between templates that have been normalized to a same size and same average intensity. The comparison algorithm may use less computational resources than the face detection process. Box 402 shows the current template that the candidate template 550 has been determined to match.

In some examples, each of the candidate templates may be scored against each of the current templates, and the candidate template with the most favorable comparison score after all of the comparisons may be selected as the matching template. Such a matching template may be a template that was determined to be substantially similar to one of the current templates. In some examples, the scoring process continues until a candidate template exceeds a threshold score and is thus selected as the matching template that best represents the face region. The similarity between a scale value of a candidate template and a scale value of a current template may affect the score of the candidate template. In some examples, at least part of the orientation of a face in a template may be identified by an orientation value (part may be illustrated by an orientation of the face in the template). The similarity between an orientation value of a candidate template and an orientation value of a current template may affect the comparison score of the candidate template.

In box 316, a face verification process may be performed on the matching template. For example, the matching template or the region of the image that corresponds to the matching template may be provided to a face verifying engine. The face verifying engine can compare the matching template or corresponding region of an image to a database of images that have been determined to represent human faces (e.g., a database of images that humans selected as representing human faces). The face verifying engine may determine whether the matching template or region surpasses a threshold probability of representing a human face, and may provide to the computing system an indication of the center of the face, an orientation of the face, a size of the face, and an indication of the location of the landmarks on the face (e.g., eyes, mouth, nose, and philtrum).

In some examples, the face verifying engine is the comprehensive face detection engine. In such examples, the comprehensive face detection engine may or may not access a database of human faces. The computing system may provide to the comprehensive face detection engine the image and vertices of the region in the image that represents the user's face, a scale of the user's face, and an orientation of the user's face. As such, the face detection engine may not need to perform comprehensive face detection procedures on the entire image, but rather may focus its computations on part of the image.

The face detection engine may verify or modify the information that was provided to the face detection engine. For example, the face detection engine may determine that the face is oriented 28 degrees instead of 30 degrees as was provided to the face detection system. In some examples, the orientation of the face that is provided to the face detection system may be determined based on (i) the change in orientation that was applied to generate the matching template from the corresponding portion of the image, and (ii) the orientation of the face in the previous image.

Should the face verifying engine identify that the matching template or region does not surpass the threshold probability for matching a human face, the process may return to box 302. In such circumstances, the computer system may have lost track of the user's face. As such, the computing system begins the face detection process again and performs the comprehensive face detection procedure of box 304. Should the face verifying engine identify that the matching template or region does surpass the threshold probability for matching a human face, the process continues to box 318.

In box 318, the computing system determines and stores face tracking information. The face tracking information may include any combination of (i) the matching template, (ii) the x-y coordinates of each of the vertices of the region that corresponds to the current template, (iii) an indication of the center of the face, (iv) an orientation of the face, (v) an indication of a scale of the face, (vi) indications of locations of landmarks on the face, and (vii) the image. The computing system may also designate the region of the image from which the matching template was generated as a region of the image that includes the user's face. Such designation may include displaying an indication on the display of a location of the user's face (even if the display does not depict the user's face) or moving the display in conformity with the determined movement of the user's face.

In box 320, the computing system outputs the current tracking information to an external process.

In box 322, the computing system determines whether to store the matching template as a current template. For example, the computing system may determine whether the matching template exhibits characteristics that are significantly different than the existing one or more current templates (e.g., by performing an SAD comparison to the current templates). If so, the computing system may store the matching template as a current template. The matching template that is stored may be a matching template that has been rotated. In some examples, the computing system always stores the most-recent matching template as the current template. In such examples, the computing system may store only a single current template, or may store the most-recent matching template along with one or more other current templates that exhibit diversity in characteristics from the most-recent matching template.

Process execution may return to box 306 in which the current template information may be stored and the system repeats the process to identify the user's face in a subsequently-captured image. The process may continue until the computer system determines to stop tracking the user's face motion (e.g., because the user turns off the computing system or closes an application that requested tracking of the user's face motion).

Figure 7:
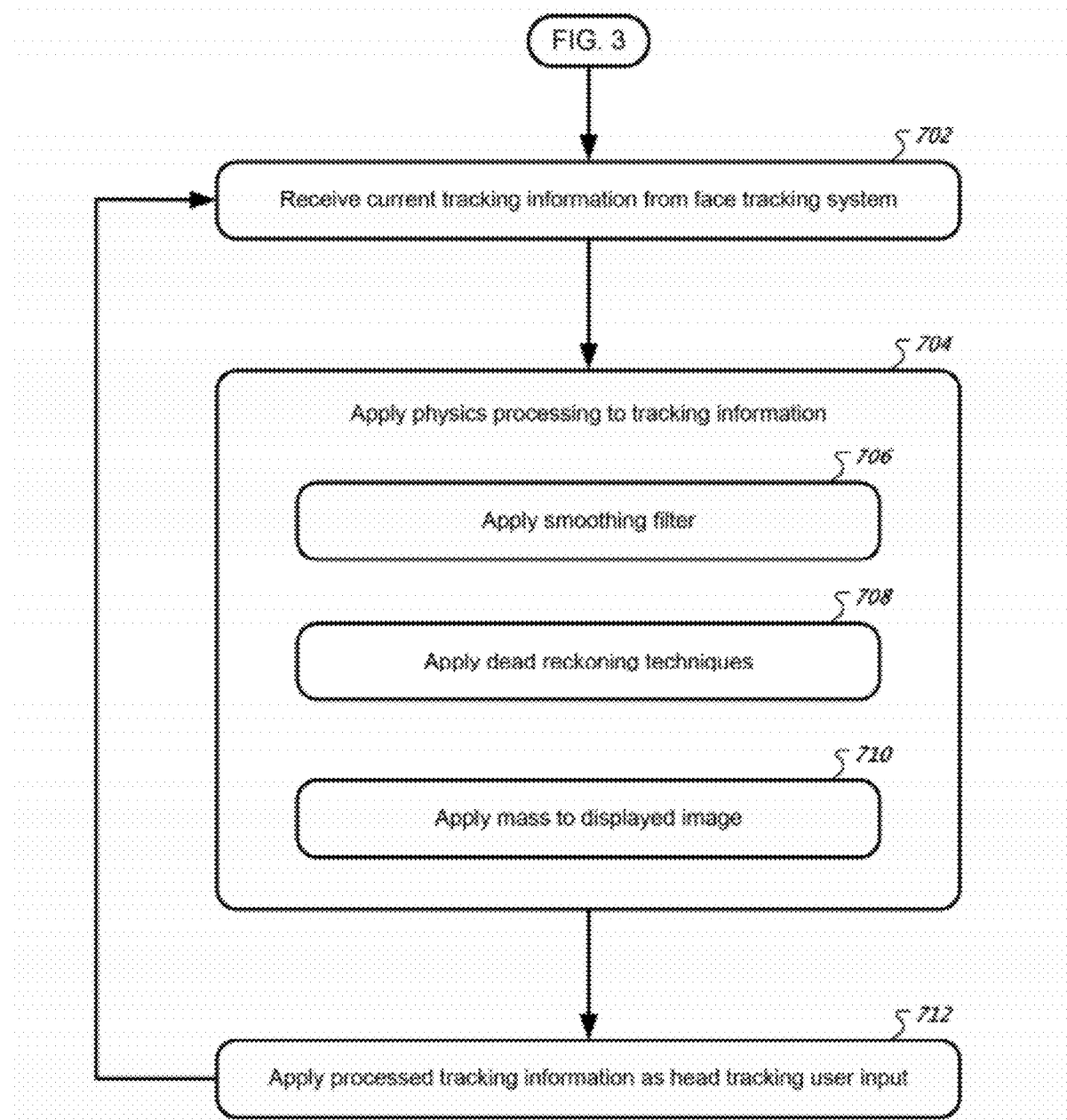
FIG. 7 shows a flow chart of an example process for using face identification information that was generated from an image.

FIG. 7 shows a flow chart of an example process for using face identification information that was generated from an image.

In box 702, the computing system receives current tracking information from the face tracking system. For example, the information described with reference to box 318 and output with reference to box 320 is received.

In box 704, the computing system applies physics processing to the tracking information. For example, in box 706, the computing system applies any combination of one or more smoothing filters to generate a single data point or region that represents a location of the user's face. Example smoothing filters include (i) a filter that averages data from the last N frames (and in which N may be a constant number, (ii) a Gaussian filter applied to the last N frames (and in which N may be a constant number), (iii) a conditional Gaussian filter, and (iv) a Kalman filter.

With the conditional Gaussian filter, the Gaussian filter may be applied to the last N frames unless a position of a tracked object is determined to move more than a threshold distance, for example, between two frames. In such an example, the Gaussian filter may not be applied to frames that occurred before the sudden movement, but may be applied to the frames that occur after the sudden movement. Stated another way, the conditional Gaussian filter may be applied to the many frames that may have occurred since a most-recent sudden jump in object movement, but not to exceed N frames. A conditional Gaussian filter may reduce latency when a sudden move in object motion occurs.

In box 708, the system applies dead reckoning techniques to the tracking information. For example, the computer system may identify that the user's face has been sweeping upwards with a trajectory of an arcing motion. The computer system, however, may temporarily lose track of the user's face. For example, the process that is described with respect to FIG. 3 may determine (at box 316) that a candidate template does not represent a human face and thus may perform the more processing-intensive comprehensive face detection process (box 304). Dead reckoning techniques may estimate the face's present location and orientation based upon any combination of past location, velocity, acceleration, and orientation information. As such, the computer system may continue to guess a user's face location for a short period of time (e.g., multiple frames) if the computer system loses track of the user's face.

In box 710, the computer system provides a conceptual mass to a displayed image that moves in response to a user's identified face movements. For example, a mass may be assigned to the displayed image so that the acceleration of the displayed image depends on the force applied to the image (e.g., using the formula F=ma). The force may increase as the user's face moves faster than the displayed image. For example, a distance may vary between the user's face and a fixed point on the moving image. The force may increase as the distance increases, as if an elastic band attached the two points.

In box 712, the computer system may apply the processed tracking information as head tracking user input for modification of a user display. For example, the computer system may move the display to the right as the user moves his/her head to the right. The computer system may zoom outward as the user moves his/her head outward.

Figure 8:
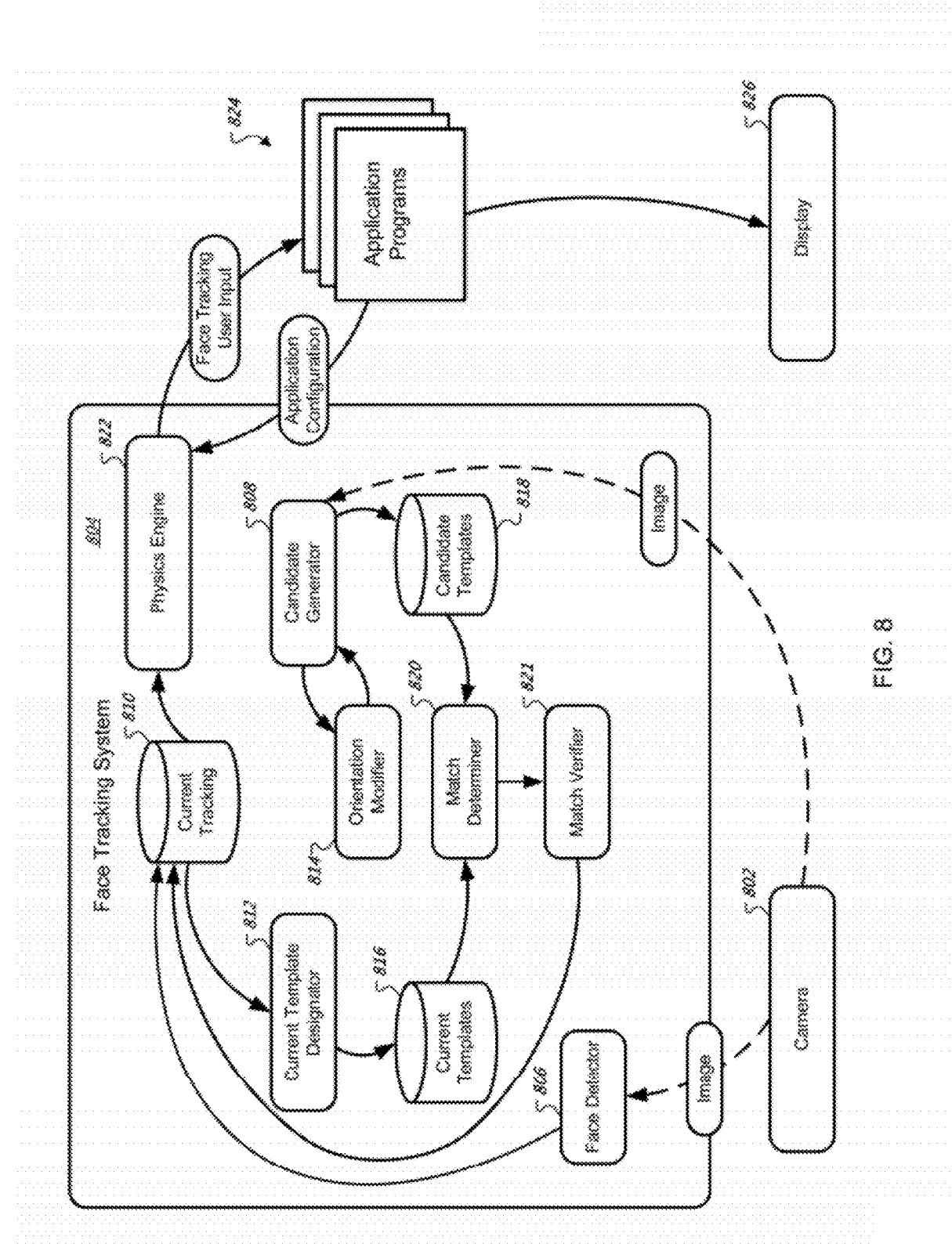
FIG. 8 shows a system for performing face tracking in an image.

FIG. 8 shows a system for performing face tracking in an image. The system can include a camera 802 that captures images and provides the images to a face tracking system 804. Specifically, the images may be provided to either the face detector 806 or the candidate template generator 808 based on a state of the face tracking system 804.

In certain states, the face detector 806 receives an image and performs a comprehensive face detection process on the image to identify a face and features of the face. The face detector 806 can store information that identifies the location and orientation of the face (and features of the face) in the current tracking storage 810. The face detector 806 may further generate a current template based on the identified face and may store the current template in the current template storage 816. In some examples, the face detector 806 performs the operations of box 304.

The current template designator 812 accesses the current tracking information from the current tracking storage 810 and determines whether a template for a recently-identified face should be stored as a current template. For example, the current template designator 812 may designate the template as a current template if the template exhibits characteristics that are substantially different from existing templates. In some examples, the current template designator 812 performs the operations of box 322.

The camera 802 may capture a subsequent image (as described at box 310). The camera provides the subsequent image to the face tracking system 804. The face tracking system 804 provides the image to the candidate generator 808 because the face tracking system 804 may be in a state in which the face tracking system 804 can track the face.

The candidate generator 808 generates multiple candidate templates for storage in the candidate template storage 818. The candidate generator 808 may generate the candidate templates by normalizing regions of the captured image. These regions may be areas in the image in which the face detection system has determined that the face is likely to be located.

Further, to generate the candidate templates, the candidate generator 808 may change a viewpoint orientation of content extracted from at least some of the regions, and may change a scale of content extracted from at least some of the regions. For example, the candidate generator 808 may provide to the orientation modifier 814 an image, vertices of a region of the image that represents a face, and a desired viewpoint from which to view the region. The orientation modifier 814 may be a graphics processing unit that processes the received information to output an image of the face from the desired viewpoint. In some examples, the candidate generator performs the operations of box 312.

The match determiner 820 may then compare each of the candidate templates to the current templates to find a pair of a candidate template and a current template that are most closely alike based on image content, and, in some examples, rotational and scale information. The candidate template that is most alike one of the current templates may be designated by the match determiner 820 as a matching template. In some examples, the match determiner 820 performs the operations of box 314.

The match verifier 821 can analyze the matching template to determine whether the matching template represents a face. For example, the match verifier 821 may compare the matching template to images that have been determined to represent human faces. The match verifier 821 may further or alternatively perform a comprehensive face detection process on the matching template.

If the matching template is not determined to illustrate a face, the face detector 806 may perform a face detection process on the image or another image that can be captured by the camera 802. If the matching template is determined to illustrate a face, the match verifier 821 may store the current tracking information (e.g., the vertices of the corresponding region of the image and the rotation of the face) in the current tracking storage 810. In some examples, the match verifier 821 performs the operations of box 316.

The physics engine 822 may repeatedly receive new current tracking information from the current tracking storage 810. The physics engine 822 processes the information to generate output data that conforms to desired characteristics. For example, different applications 824 (e.g., application programs) of a computing system may use face tracking information differently. Some applications may operate more favorably with a smooth representation of the movement of the user's head as user input. As an example, it may be desirable that an application that displays a map or a web page smoothly trucks sideways and without significant jerking as the user moves his/her face around. On the other hand, an application that uses face movements to steer a racecar in a game may favorably use very sudden changes in face location and orientation. As such, each application may provide an application configuration to the physics engine. Each application configuration may specify the desired characteristics of the face tracking user input that the application may receive as an output from the physics engine 822.

Accordingly, the physics engine 822 may apply various forms of smoothing filters, dead reckoning techniques, and acceleration constraints on the information in the current tracking storage 810 to generate face tracking user input for use by the applications 824. The applications may use the face tracking user input to modify the display of an image on the computer system's display 826. In some examples, the physics engine 822 performs the operations of box 704.

In various implementations, the techniques described in this disclosure may be applied to track objects that are not faces (e.g., hands, vehicles, and baseballs). As such, a robust object detector may analyze an image to recognize the object and, once the object is identified, may generate a current template and attempt to match candidate templates in subsequent images to the current template.

Figure 9:
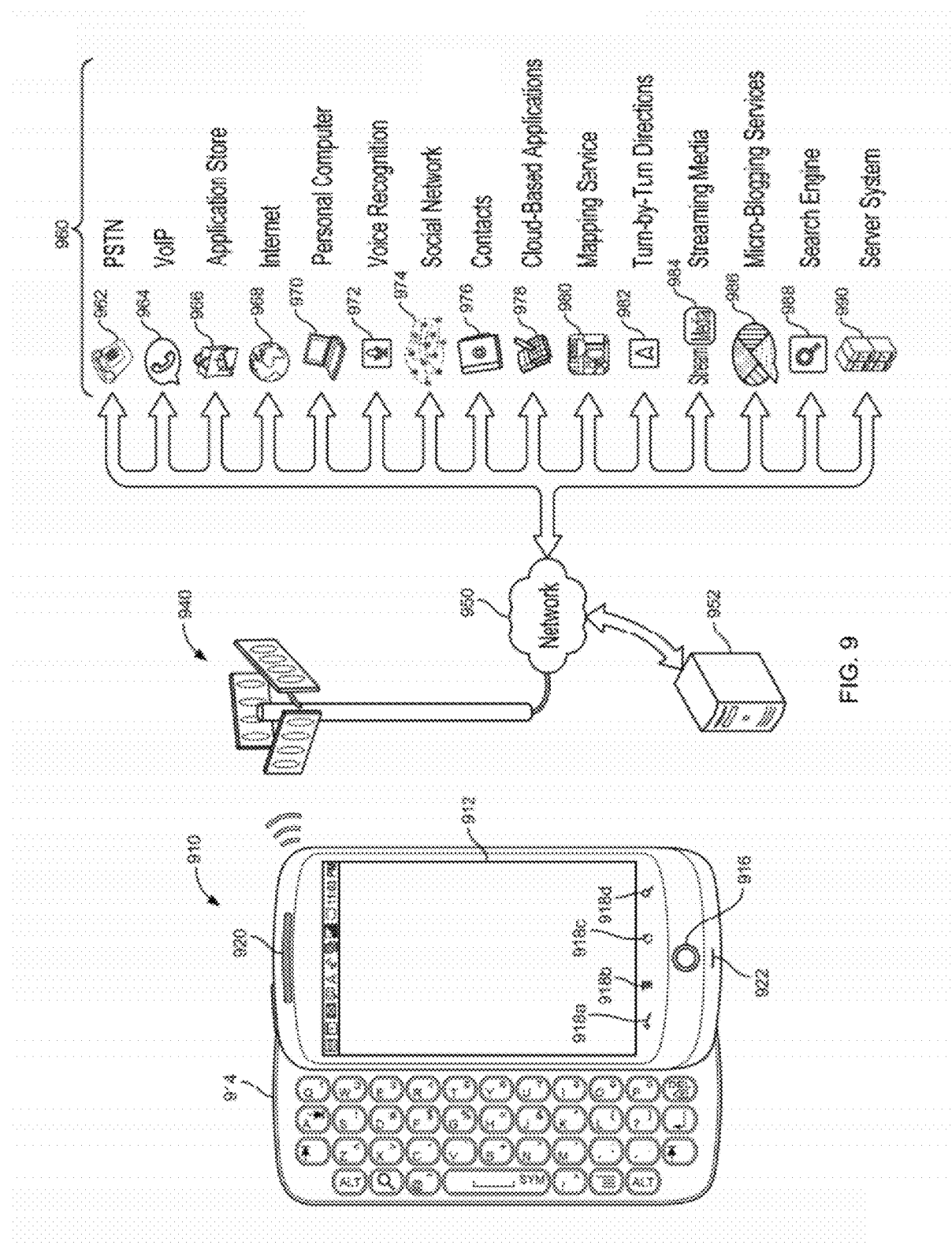
FIG. 9 is a conceptual diagram of a system that may be used to implement the systems and methods described in this document.

Referring now to FIG. 9, a conceptual diagram of a system that may be used to implement the systems and methods described in this document is illustrated. In the system, a mobile computing device 910 can wirelessly communicate with base station 940, which can provide the mobile computing device wireless access to numerous hosted services 960 through a network 950.

In this example, the mobile computing device 910 is depicted as a handheld mobile telephone (e.g., a smartphone, or application telephone) that includes a touchscreen display device 912 for presenting content to a user of the mobile computing device 910 and receiving touch-based user inputs. Other visual, auditory, and tactile output components may also be provided (e.g., LED lights, a speaker for providing tonal, voice-generated, or recorded output, or vibrating mechanisms for tactile output), as may various different input components (e.g., keyboard 914, physical buttons, trackballs, accelerometers, gyroscopes, and magnetometers).

Example visual output mechanism in the form of display device 912 may take the form of a 3.7 or 4.3 inch LED or AMOLED display with resistive or capacitive touch capabilities, for displaying video, graphics, images, and text, and coordinating user touch inputs locationally with the displayed information so that user contact above a displayed item may be associated with the item by the device 910. The mobile computing device 910 may take alternative forms also, including as a laptop computer, a tablet or slate computer, a personal digital assistant, an embedded system (e.g., a car navigation system), a desktop personal computer, or a computerized workstation.

An example mechanism for receiving user-input includes keyboard 914, which may be a full qwerty keyboard or a traditional keypad that includes keys for the digits '0-9', '*', and '#.' The keyboard 914 receives input when a user physically contacts or depresses a keyboard key. User manipulation of a trackball 916 or interaction with a trackpad enables the user to supply directional and rate of rotation information to the mobile computing device 910 (e.g., to manipulate a position of a cursor on the display device 912).

The mobile computing device 910 may be able to determine a position of physical contact with the touchscreen display device 912 (e.g., a position of contact by a finger or a stylus). Using the touchscreen 912, various "virtual" input mechanisms may be produced, where a user interacts with a graphical user interface element depicted on the touchscreen 912 by contacting the graphical user interface element. An example of a "virtual" input mechanism is a "software keyboard," where a keyboard is displayed on the touchscreen and a user enters input that selects keys by pressing a region of the touchscreen 912 that corresponds to each key.

The mobile computing device 910 may include mechanical or touch sensitive buttons 918a-d. Additionally, the mobile computing device may include buttons for adjusting volume output by the one or more speakers 920, and a button for turning the mobile computing device on or off. A microphone 922 allows the mobile computing device 910 to convert audible sounds into an electrical signal that may be digitally encoded and stored in computer-readable memory, or transmitted to another computing device. The mobile computing device 910 may also include a digital compass, an accelerometer, proximity sensors, and ambient light sensors.

An operating system may provide an interface between the mobile computing device hardware (e.g., the input/output mechanisms and a processor executing instructions retrieved from computer-readable medium) and software. Example operating systems include the ANDROID mobile device platform; APPLE IPHONE/MAC OS X operating systems; MICROSOFT WINDOWS 7/WINDOWS MOBILE operating systems; SYMBIAN operating system; RIM BLACKBERRY operating system; PALM WEB operating system; a variety of UNIX-flavored operating systems; or a proprietary operating system for computerized devices. The operating system may provide a platform for the execution of applications that facilitate interaction between the computing device and a user.

The mobile computing device 910 may present a graphical user interface with the touchscreen 912. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and text associated with the icon. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 904. User-selection of the button may invoke the pre-defined action.

In some examples, the operating system provides a "desktop" user interface that is displayed upon turning on the mobile computing device 910, activating the mobile computing device 910 from a sleep state, upon "unlocking" the mobile computing device 910, or upon receiving user-selection of the "home" button 918c. The desktop graphical interface may display several icons that, when selected with user-input, invoke corresponding applications. An invoked applications may present a graphical interface that replaces the desktop graphical interface until the application terminates or is hidden from view.

User-input may manipulate a sequence of mobile computing device 910 operations. For example, a single-action user input (e.g., a single tap of the touchscreen, swipe across the touchscreen, contact with a button, or combination of these at a same time) may invoke an operation that changes a display of the user interface. Without the user-input, the user interface may not have changed at a particular time. For example, a multi-touch user input with the touchscreen 912 may invoke a mapping application to "zoom-in" on a location, even though the mapping application may have by default zoomed-in after several seconds.

The desktop graphical interface can also display "widgets." A widget is one or more graphical interface elements that are associated with an application that has been executed, and that display on the desktop content controlled by the executing application. An application supporting a widget may start with the mobile telephone. Further, a widget may not take focus of the full display. Instead, a widget may only "own" a small portion of the desktop, displaying content and receiving touchscreen user-input within the portion of the desktop.

The mobile computing device 910 may include one or more location-identification mechanisms. A location-identification mechanism may include a collection of hardware and software that provides the operating system and applications an estimate of the geographical position of the mobile telephone. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by "checking in" to a location).

The mobile computing device 910 may include other application modules and hardware. A call handling unit may receive an indication of an incoming telephone call and provide a user capabilities to answer the incoming telephone call. A media player may allow a user to listen to music or play movies that are stored in local memory of the mobile computing device 910. The mobile telephone 910 may include a digital camera sensor, and corresponding image and video capture and editing software. An internet browser may enable the user to view content from a web page by typing in an addresses corresponding to the web page or selecting a link to the web page.

The mobile computing device 910 may include an antenna to wirelessly communicate information with the base station 940. The base station 940 may be one of many base stations in a collection of base stations (e.g., a mobile telephone cellular network) that enables the mobile computing device 910 to maintain communication with a network 950 as the mobile computing device is geographically moved. The computing device 910 may alternatively or additionally communicate with the network 950 through a Wi-Fi router or a wired connection (e.g., Ethernet, USB, or FIREWIRE). The computing device 910 may also wirelessly communicate with other computing devices using BLUETOOTH protocols, or may employ an ad-hoc wireless network.

A service provider that operates the network of base stations may connect the mobile computing device 910 to the network 950 to enable communication between the mobile computing device 910 and other computerized devices that provide services 960. Although the services 960 may be provided over different networks (e.g., the internal network of the service provider, the Public Switched Telephone Network, and the Internet), network 950 is illustrated as a single network. The service provider may operate a server system 952 that routes information packets and voice data between the mobile computing device 910 and computing devices associated with the services 960.

The network 950 may connect the mobile computing device 910 to the Public Switched Telephone Network (PSTN) 962 to establish voice or fax communication between the mobile computing device 910 and another computing device. For example, the service provider server system 952 may receive an indication from the PSTN 962 of an incoming call for the mobile computing device 910. Conversely, the mobile computing device 910 may send a communication to the service provider server system 952 initiating a telephone call with a telephone number that is associated with a device accessible through the PSTN 962.

The network 950 may connect the mobile computing device 910 with a Voice over Internet Protocol (VoIP) service 964 that routes voice communications over an IP network, as opposed to the PSTN. For example, a user of the mobile computing device 910 may invoke a VoIP application and initiate a call using the program. The service provider server system 952 may forward voice data from the call to a VoIP service, which may route the call over the internet to a corresponding computing device, potentially using the PSTN for a final leg of the connection.

An application store 966 may provide a user of the mobile computing device 910 the ability to browse a list of remotely stored applications that the user may download over the network 950 and install on the mobile computing device 910. The application store 966 may serve as a repository of applications developed by third-party application developers. An application that is installed on the mobile computing device 910 may be able to communicate over the network 950 with server systems that are designated for the application. For example, a VoIP application may be downloaded from the Application Store 966, enabling the user to communicate with the VoIP service 964.

The mobile computing device 910 may access content on the internet 968 through network 950. For example, a user of the mobile computing device 910 may invoke a web browser application that requests data from remote computing devices that are accessible at designated universal resource locations. In various examples, some of the services 960 are accessible over the internet.

The mobile computing device may communicate with a personal computer 970. For example, the personal computer 970 may be the home computer for a user of the mobile computing device 910. Thus, the user may be able to stream media from his/her personal computer 970. The user may also view the file structure of his/her personal computer 970, and transmit selected documents between the computerized devices.

A voice recognition service 972 may receive voice communication data recorded with microphone 922 of the mobile computing device, and translate the voice communication into corresponding textual data. In some examples, the translated text is provided to a search engine as a web query, and responsive search engine search results are transmitted to the mobile computing device 910.

The mobile computing device 910 may communicate with a social network 974. The social network may include numerous members, some of which have agreed to be related as acquaintances. Applications on the mobile computing device 910 may access the social network 974 to retrieve information based on the acquaintances of the user of the mobile computing device. For example, an "address book" application may retrieve telephone numbers for the user's acquaintances. In various examples, content may be delivered to the mobile computing device 910 based on social network distances from the user to other members. For example, advertisement and news article content may be selected for the user based on a level of interaction with such content by members that are "close" to the user (e.g., members that are "friends" or "friends of friends").

The mobile computing device 910 may access a personal set of contacts 976 through network 950. Each contact may identify an individual and include information about that individual (e.g., a phone number, an email address, and a birthday). Because the set of contacts is hosted remotely to the mobile computing device 910, the user may access and maintain the contacts 976 across several devices as a common set of contacts.

The mobile computing device 910 may access cloud-based applications 978. Cloud-computing provides applications (e.g., a word processor or an email program) that are hosted remotely from the mobile computing device 910, and may be accessed by the device 910 using a web browser or a dedicated program. Example cloud-based applications include GOOGLE DOCS word processor and spreadsheet service, GOOGLE GMAIL webmail service, and PICASA picture manager.

Mapping service 980 can provide the mobile computing device 910 with street maps, route planning information, and satellite images. An example mapping service is GOOGLE MAPS. The mapping service 980 may also receive queries and return location-specific results. For example, the mobile computing device 910 may send an estimated location of the mobile computing device and a user-entered query for "pizza places" to the mapping service 980. The mapping service 980 may return a street map with "markers" superimposed on the map that identify geographical locations of nearby "pizza places."

Turn-by-turn service 982 may provide the mobile computing device 910 with turn-by-turn directions to a user-supplied destination. For example, the turn-by-turn service 982 may stream to device 910 a street-level view of an estimated location of the device, along with data for providing audio commands and superimposing arrows that direct a user of the device 910 to the destination.

Various forms of streaming media 984 may be requested by the mobile computing device 910. For example, computing device 910 may request a stream for a pre-recorded video file, a live television program, or a live radio program. Example services that provide streaming media include YOUTUBE and PANDORA.

A micro-blogging service 986 may receive from the mobile computing device 910 a user-input post that does not identify recipients of the post. The micro-blogging service 986 may disseminate the post to other members of the micro-blogging service 986 that agreed to subscribe to the user.

A search engine 988 may receive user-entered textual or verbal queries from the mobile computing device 910, determine a set of internet-accessible documents that are responsive to the query, and provide to the device 910 information to display a list of search results for the responsive documents. In examples where a verbal query is received, the voice recognition service 972 may translate the received audio into a textual query that is sent to the search engine.

These and other services may be implemented in a server system 990. A server system may be a combination of hardware and software that provides a service or a set of services. For example, a set of physically separate and networked computerized devices may operate together as a logical server system unit to handle the operations necessary to offer a service to hundreds of individual computing devices.

In various implementations, operations that are performed "in response" to another operation (e.g., a determination or an identification) are not performed if the prior operation is unsuccessful (e.g., if the determination was not performed). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

Figure 10:
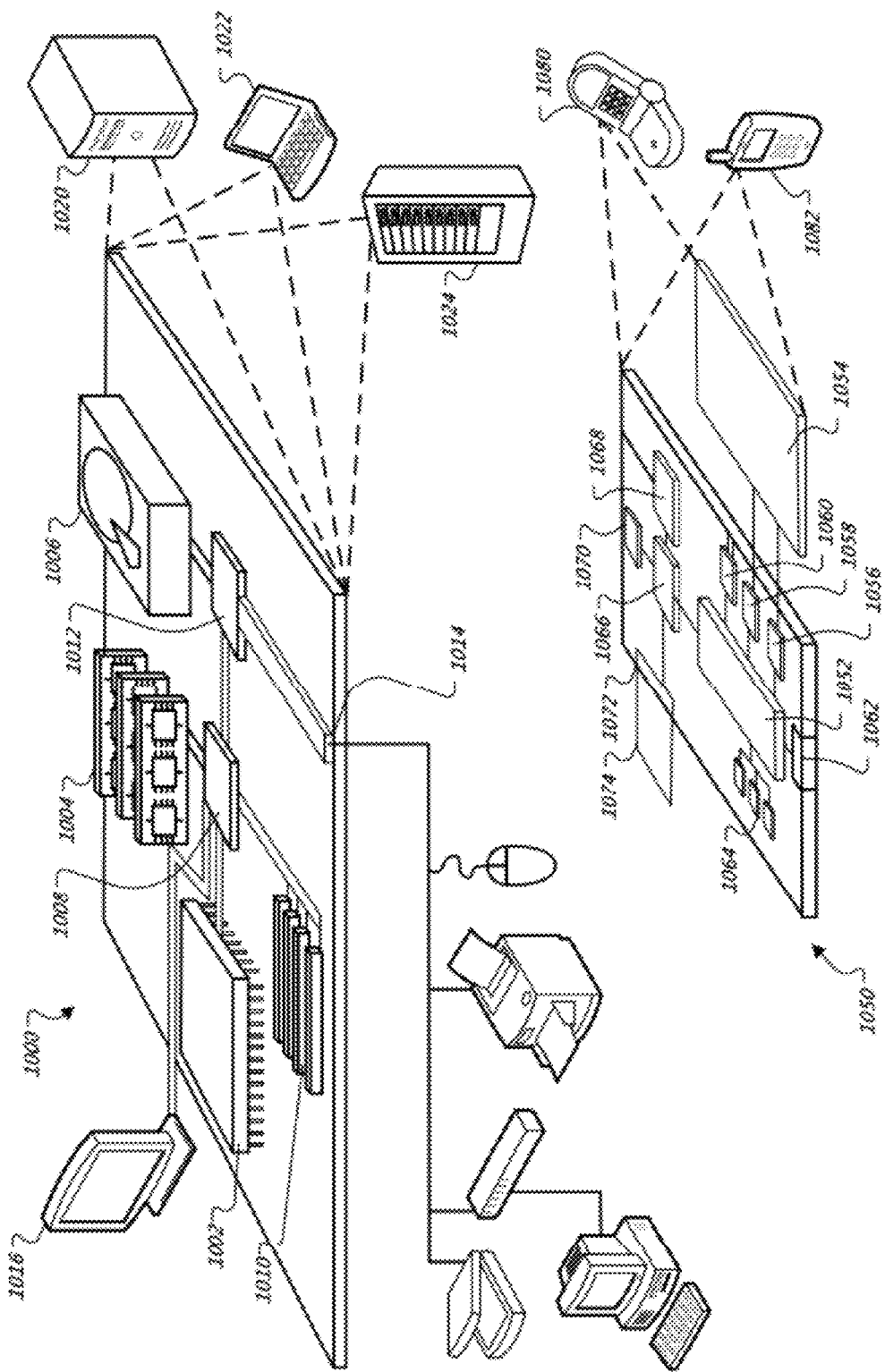
FIG. 10 is a block diagram of computing devices that may be used to implement the systems and methods described in this document, as either a client or as a server or plurality of servers.

FIG. 10 is a block diagram of computing devices 1000, 1050 that may be used to implement the systems and methods described in this document, as either a client or as a server or plurality of servers. Computing device 1000 is intended to represent various forms of digital computers, such as laptops, desktops, workstations, personal digital assistants, servers, blade servers, mainframes, and other appropriate computers. Computing device 1050 is intended to represent various forms of mobile devices, such as personal digital assistants, cellular telephones, smartphones, and other similar computing devices. The components shown here, their connections and relationships, and their functions, are meant to be exemplary only, and are not meant to limit implementations described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT (Thin-Film-Transistor Liquid Crystal Display) display or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052 that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, WiFi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smartphone 1082, personal digital assistant, or other similar mobile device.

Additionally computing device 1000 or 1050 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method, comprising:
accessing, by a computing system, an indication of a first template that includes a region of a first image, the region of the first image including a graphical representation of a human face;
receiving, by the computing system, a second image;
identifying, by the computing system, indications of multiple candidate templates, each respective candidate template from the multiple candidate templates including a respective candidate region of the second image, wherein:
the multiple candidate templates are normalized representations of their respective regions of the second image,
normalizing the respective regions of the second image to generate the multiple candidate templates includes changing a viewpoint of at least one of the respective regions of the second image,
the human face in the at least one respective region of the second image is not directed forward, and
changing the viewpoint of the at least one respective region includes changing the viewpoint so that the human face in the respective candidate template is directed forward; and
comparing, by the computing system, at least the first template to each of the multiple candidate templates, to identify a matching template from among the multiple candidate templates that includes a candidate region that matches the region of the first image that includes the graphical representation of the human face.

2. The computer-implemented method of claim 1, wherein comparing at least the first template to each of the multiple candidate templates includes performing a pixel-wise sum of the absolute differences between the at least first template and one of the multiple candidate templates.

3. The computer-implemented method of claims 1, further comprising designating, by the computing system and as a region of the second image that includes a graphical representation of the human face in the second image, the region of the second image that is included in the matching template.

4. The computer-implemented method of claim 1, further comprising:
receiving the first image at the computing system as a first frame of a video that is captured by a camera; wherein:
the second image is a second frame of the video that is captured by the camera, and
the second frame is an immediately next frame in the video after the first frame.

5. The computer-implemented method of claim 1, further comprising:
requesting, by the computing system, an object detection process on the first image to identify the region of the first image as including the graphical representation of the human face, the object detection process analyzing one or more portions of the first image that are not included in the region of the first image;
wherein comparing at least the first template to each of the multiple candidate templates does not include analyzing one or more portions of the second image that are outside of the respective multiple candidate templates.

6. The computer-implemented method of claim 1, further comprising:
requesting, by the computing system, an object detection process on the first image to identify the region of the first image as including the graphical representation of the human face, wherein:

the object detection process performs one or more feature detection processes on the first image; and comparing the first template to each individual candidate template of the multiple candidate templates does not include performing the one or more feature detection processes on each individual candidate template.

7. The computer-implemented method of claim 1, further comprising:

requesting, by the computing system, an object detection process on the first image to identify the region of the first image as including the graphical representation of the human face, wherein the object detection process is performed by a central processing unit of the computing system or another computing system and comparing at least the first template to each of the multiple candidate templates is performed by a graphics processing unit of the computing system.

8. The computer-implemented method of claim 1, further comprising:

generating, by the computing system, multiple additional first templates that include respective regions of different images, the regions of the different images including respective graphical representations the human face; and wherein comparing at least the first template to each of the multiple candidate templates includes comparing the multiple additional first templates to each of the multiple candidate templates to identify the matching template from among the multiple candidate templates that matches a region included in one of the first templates.

9. The computer-implemented method of claim 1, wherein the region of the first image includes mouth, nose, and eyes of the human face.

10. The computer-implemented method of claim 1, wherein:

the region of the first image is a non-rectangular region;

the first template is a normalized representation of the region of the first image; and generating the normalized representation of the region of the first image includes generating a rectangular representation of the region of the first image.

11. The computer-implemented method of claim 1, wherein the first template has same dimensions as each of the multiple candidate templates.

12. The computer-implemented method of claim 1, wherein:

the first template is a normalized representation of the region of the first image; and normalizing the region of the first image to generate the first template includes changing a viewpoint of the region of the first image.

13. The computer-implemented method of claim 1, further comprising, before identifying the matching template that includes the candidate region that matches the region of the first image, verifying that the matching template represents a human face by providing the matching template or a graphical representation included in the matching template to a face verification system.

14. The computer-implemented method of claim 1, further comprising using a location of the candidate region, of the matching template, in the second image to truck at least a portion of a view on a graphical display of the computing system so as to at least partially track movement of the human face with the at least portion of the view on the graphical display.

15. The computer-implemented method of claim 1, wherein identifying the indications of the multiple candidate templates includes selecting, as the regions of the second image to include in the respective multiple candidate templates, regions of the second image based on a determined trajectory of the human face in the first image and images that were received before the first image.

16. A computer-implemented method, the method comprising:

receiving, by a computing system, a first frame of a video;

requesting, by the computing system, an object detection process on the first frame of the video in order to identify an object;

receiving, by the computing system and in response to requesting the object detection process, an indication of a first region of the first frame that includes a graphical representation of the object;

receiving, by the computing system, a second frame of the video;

requesting, by the computing system, identification of multiple candidate regions in the second frame;

requesting, by the computing system, indications of multiple candidate templates that represent versions of the multiple candidate regions, at least one of the multiple candidate templates including a graphical representation of a viewpoint of the represented candidate region that has been changed from a graphical representation of a viewpoint of the represented candidate region as included in the second frame so as to be directed forward and different than the graphical representation of the viewpoint of the represented candidate region as included in the second frame, the graphical representation of the viewpoint of the represented candidate region as included in the second frame not being directed forward;

requesting, by the computing system, comparison of the multiple candidate templates to the first region or a first template that is generated from the first region to identify a matching template that has been identified matching the first region or the first template; and designating, by the computing system, the region of the second frame from which the matching template was generated as a region of the second frame that includes a graphical representation of the object.

17. A computerized system, including:

a camera adapted to receive multiple frames of video;

one or more tangible computer-readable memory devices to store an indication of a first region, in a first frame of the video, that includes a graphical representation of a human face;

a computerized face candidate generator to (i) identify, in a second frame of the video that is subsequent to the first frame of the video, multiple candidate regions, and (ii) create multiple candidate templates from at least some of the multiple candidate regions, at least some of the multiple candidate templates illustrating the respective candidate regions from viewpoints that are different than viewpoints of the respective candidate regions so that the human faces in the at least some multiple candidate templates are directed forward, the human faces in the respective candidate regions not being directed forward; and a computerized match determiner to compare the multiple candidate regions and the multiple candidate templates to the first region in order to identify one of the multiple candidate regions as including a graphical representation of the human face in the second frame of the video.

18. The computerized system of claim 17, wherein:

each of the multiple candidate template is a representation of the respective candidate region that has been normalized to a standard image size; and the computerized match determiner's comparing the multiple candidate regions to the first region includes comparing the multiple candidate templates to the first region or a template that is generated from the first region.

19. A computer-implemented method, comprising:

accessing, by a computing system, an indication of a first region of a first frame of a video, the first region of the first frame of the video including a graphical representation of a human face;

receiving, by the computing system, a second frame of the video;

identifying, by the computing system, multiple candidate regions of the second image;

changing a viewpoint of a candidate region, of the multiple candidate regions, in which the human face is not directed forward so that the human face in the candidate region is directed forward; and comparing, by the computing system, the first region to each of the multiple candidate regions, including the candidate region in which the viewpoint of the candidate region was changed so that the human face was directed forward, to identify a matching region from among the multiple candidate regions that has been identified matching the first region.

20. The computer-implemented method of claim 19, wherein the matching region is the candidate region in which the viewpoint of the candidate region was changed so that the human face in the candidate region is directed forward.

* * * * *